United States Patent
Chang et al.

(10) Patent No.: US 12,111,965 B2
(45) Date of Patent: Oct. 8, 2024

(54) HANDHELD CONTROLLER

(71) Applicant: HTC Corporation, Taoyuan (TW)

(72) Inventors: Li-Hsun Chang, Taoyuan (TW);
Yu-Hsun Chung, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/839,497

(22) Filed: Jun. 14, 2022

(65) Prior Publication Data

US 2023/0400922 A1    Dec. 14, 2023

(51) Int. Cl.
*G06F 3/01* (2006.01)
*G06F 3/03* (2006.01)
*G06F 3/0346* (2013.01)
*G06F 3/038* (2013.01)
*G06V 40/16* (2022.01)

(52) U.S. Cl.
CPC .............. *G06F 3/014* (2013.01); *G06F 3/016* (2013.01); *G06F 3/0304* (2013.01); *G06F 3/0346* (2013.01); *G06F 3/0383* (2013.01); *G06V 40/16* (2022.01)

(58) Field of Classification Search
CPC . G06F 3/03543; G06F 3/014; G06F 2203/015
USPC .......................... 345/161, 157, 156, 163, 345
See application file for complete search history.

(56) References Cited

U.S. PATENT DOCUMENTS

| | | | | |
|---|---|---|---|---|
| 5,847,695 A | * | 12/1998 | Duncan | G06F 3/03543 345/157 |
| 5,909,521 A | * | 6/1999 | Nakao | H04N 1/3876 382/312 |
| 6,480,184 B1 | * | 11/2002 | Price | G06F 3/03543 345/157 |
| 8,248,372 B2 | * | 8/2012 | Saila | G06F 3/03545 345/169 |
| D913,750 S | * | 3/2021 | Toumayan | D7/533 |
| 11,157,080 B2 | | 10/2021 | Nakamura et al. | |
| D934,558 S | * | 11/2021 | Teves | D3/218 |
| 2004/0263358 A1 | * | 12/2004 | Madsen | G06F 3/033 341/20 |
| 2005/0172734 A1 | | 8/2005 | Alsio et al. | |
| 2006/0007151 A1 | * | 1/2006 | Ram | G06F 3/0395 345/163 |

(Continued)

FOREIGN PATENT DOCUMENTS

| | | |
|---|---|---|
| CN | 106575164 | 4/2017 |
| CN | 108536291 | 9/2018 |
| TW | 201905672 | 2/2019 |

OTHER PUBLICATIONS

"Litho" retrieved from "https://www.litho.cc/", pp. 1-15.
"Office Action of Taiwan Counterpart Application", issued on Jan. 17, 2023, p. 1-p. 6.

*Primary Examiner* — William Boddie
*Assistant Examiner* — Alecia D English
(74) *Attorney, Agent, or Firm* — JCIPRNET

(57) ABSTRACT

A handheld controller is suitable for controlling an electronic device. The handheld controller includes a first body, a second body and a connecting portion. The first body is suitable for being held by a hand of a user. The connecting portion connects the first body and the second body. The second body is electrically connected to the first body through the connecting portion, and the connecting portion is suitable for being clamped between fingers of the user.

9 Claims, 9 Drawing Sheets

(56) References Cited

U.S. PATENT DOCUMENTS

| | | | | |
|---|---|---|---|---|
| 2007/0013657 A1* | 1/2007 | Banning | ............... | G06F 3/0346 |
| | | | | 345/157 |
| 2008/0170033 A1* | 7/2008 | Schultz | ................ | G06F 3/0321 |
| | | | | 345/157 |
| 2010/0296133 A1* | 11/2010 | Zahnert | .............. | H04N 1/00127 |
| | | | | 358/473 |
| 2011/0193781 A1* | 8/2011 | Utsunomiya | ....... | G06F 3/03543 |
| | | | | 345/166 |
| 2012/0043452 A1* | 2/2012 | Karmatz | ................. | B25G 1/04 |
| | | | | 16/110.1 |
| 2015/0258431 A1* | 9/2015 | Stafford | ................. | G06F 3/014 |
| | | | | 463/31 |
| 2017/0315616 A1* | 11/2017 | Kim | ....................... | G06F 3/016 |
| 2018/0376042 A1* | 12/2018 | Kim | ...................... | G02B 7/021 |
| 2019/0265834 A1 | 8/2019 | Rosenberg et al. | | |
| 2019/0304291 A1* | 10/2019 | Camp | ................... | G08B 25/009 |
| 2020/0112205 A1* | 4/2020 | Weisband | ............... | H02J 7/342 |
| 2021/0408670 A1* | 12/2021 | Woods, Jr. | .......... | H04M 1/0202 |

\* cited by examiner

HANDHELD CONTROLLER

BACKGROUND

Technical Field

The disclosure relates to a controller, and particularly relates to a handheld controller.

Description of Related Art

A user may control an electronic device through a handheld controller. In order to prevent the handheld controller from being detached from the user's hand when user's action is excessive or too intense, and meanwhile make the handheld controller to stay on the user's hand when not in use, the handheld controller may be fixed on the user's hand in a manner of binding with the palm through a strap or letting the fingers to pass through the strap. However, these two manners are both inconvenient for the user to put on and take off the handheld controller, and are likely to cause fatigue of the user's hand, resulting in a decrease in the comfort of use.

SUMMARY

The disclosure provides a handheld controller, which is used for controlling an electronic device.

A handheld controller of the disclosure is suitable for controlling an electronic device. The handheld controller includes a first body, a second body and a connecting portion. The first body is suitable for being held by a hand of a user. The connecting portion connects the first body and the second body. The second body is electrically connected to the first body through the connecting portion, and the connecting portion is suitable for being clamped between fingers of the user.

Based on the above description, in the disclosure, the handheld controller may be fixed on the hand by means of finger clamping, and the user may easily fix the handheld controller on the hand, and the handheld controller is not easy to fall off even if there is a large movement. In addition, since an opening angle of the fingers is limited and the fingers are bent under a natural circumstance, the fingers are always maintained between the first body and the second body. When the user does not need to use the handheld controller, the handheld controller may be easily fixed on the hand without falling off.

DESCRIPTION OF THE EMBODIMENTS

Figure 1A:
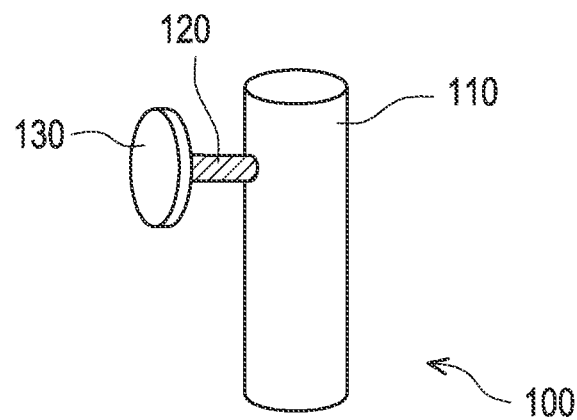
FIG. 1A is a schematic diagram of a handheld controller according to an embodiment of the invention.
Figure 1B:
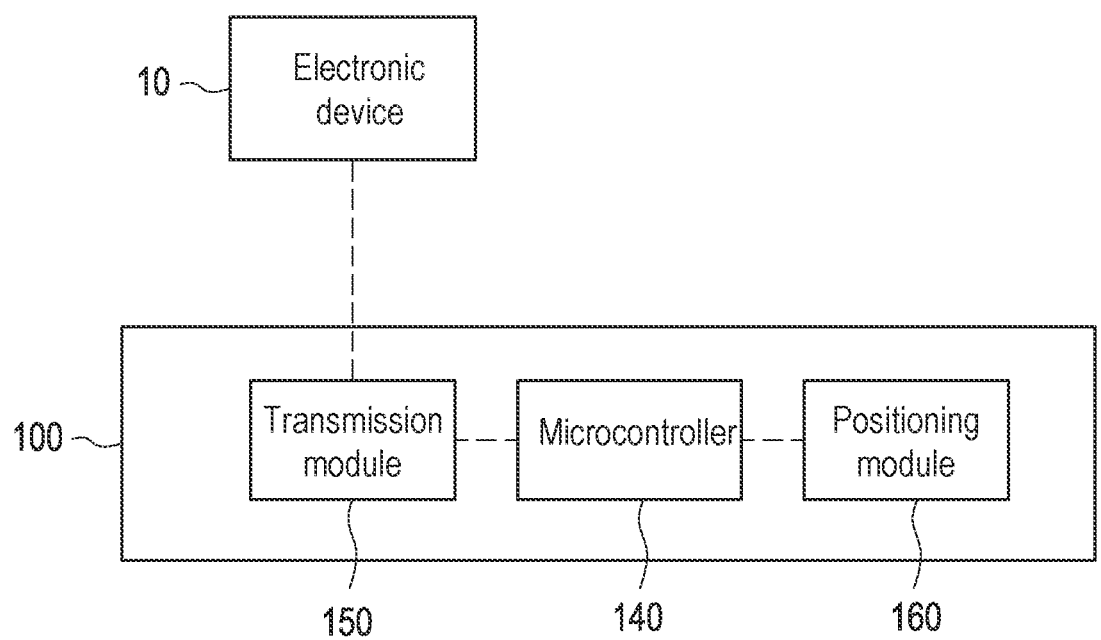
FIG. 1B is a block diagram of a control system of the handheld controller of FIG. 1A.

Referring to FIG. 1A and FIG. 1B, in the embodiment, a handheld controller 100 is suitable for controlling an electronic device 10. The handheld controller 100 includes a first body 110, a connecting portion 120 and a second body 130. The first body 110 is suitable for being held by a hand of a user. The connecting portion 120 connects the first body 110 and the second body 130. The connecting portion 120 is adapted to be clamped between fingers of the user. The second body 130 is electrically connected to the first body 110 through the connecting portion 120. Namely, the first body 110 and the second body 130 may use the connecting portion 120 to transmit signals. In the embodiment, the handheld controller 100 may further include a microcontroller 140, a transmission module 150 and a positioning module 160, where the transmission module 150 is electrically connected to the microcontroller 140, and the positioning module 160 is electrically connected to the microcontroller 140. When the user uses the handheld controller 100 and moves, the positioning module 160 may transmit detected positioning information to the microcontroller 140, and then positioning information is transmitted to the electronic device 10 through the transmission module 150.

In the embodiment, the positioning module 160 may include an inertial measurement unit (IMU). For example, the positioning module 160 may be a six-axis inertial measurement unit. The six axes include accelerometers of X, Y, and Z axes and gyroscopes of the X, Y, and Z axes. The positioning module 160 may also be a nine-axis inertial measurement unit. Nine axes include accelerometers of X, Y, and Z axes, gyroscopes of X, Y, and Z axes, and magnetometers of X, Y, and Z axes. In other words, the accelerometers of the X, Y, and Z axes are used to output acceleration values of the X, Y, and Z axes, the gyroscopes of the X, Y, and Z axes are used to output angular velocity values of the X, Y, and Z axes, and the magnetometers of X, Y, and Z axes are used to output magnetic values of the X, Y, and Z axes.

Figure 1C:
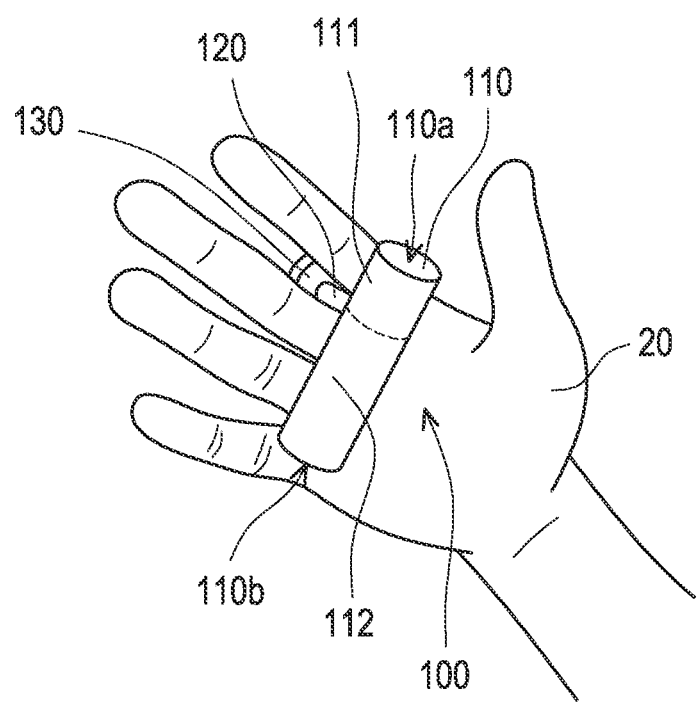
FIG. 1C is a schematic diagram of the handheld controller of FIG. 1A clamped on a user's hand.
Figure 1D:
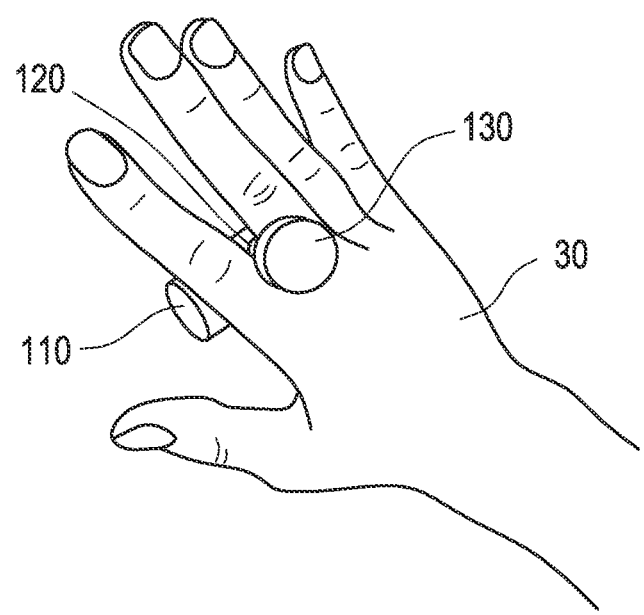
FIG. 1D is a schematic view of the handheld controller of FIG. 1C clamped on a user's hand from another viewing angle.
Figure 1E:
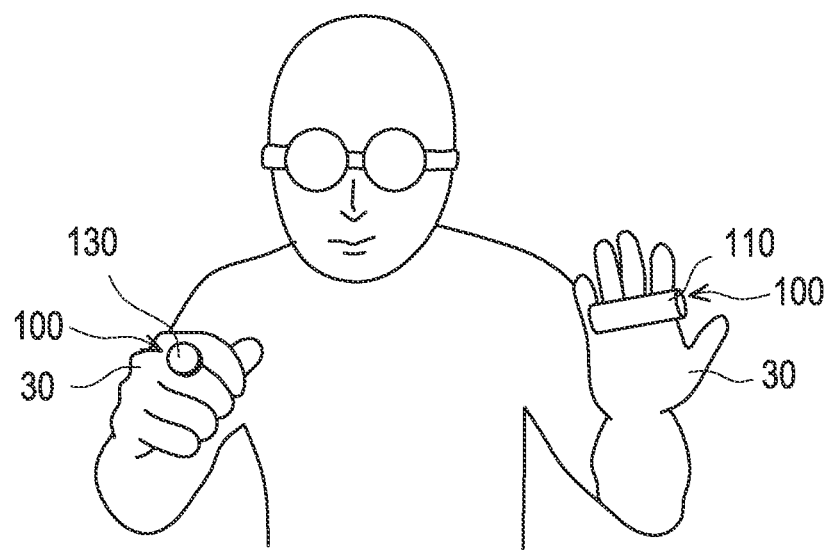
FIG. 1E is a schematic diagram of the handheld controllers of FIG. 1A being operated by a user in pairs.

Referring to FIG. 1C to FIG. 1E, in the embodiment, the first body 110 may have a first end 110a and a second end 110b opposite to each other, and the connecting portion 120 is located between the first end 110a and the second end 110b. The first body 110 further has a first holding portion 111 and a second holding portion 112, and the first holding portion 111 is located between the connecting portion 120 and the first end 110a, and the second holding portion 112 is located between the connecting portion 120 and the second end 110b. The first holding portion 111 is suitable for being held by an index finger of the user, and the second holding portion 112 is suitable for being held by at least a middle finger and a ring finger of the user. Therefore, a distance between the connecting portion 120 and the first end 110a (i.e., a width of the index finger) may be smaller than a distance between the connecting portion 120 and the second end 110b (i.e., the sum of widths of the middle finger and the ring finger or a sum of widths of the middle finger, the ring finger and the little finger). When the user's fingers clamp the connecting portion 120, the first body 110 is located on a palm of the user, and the second body 130 is located on a palm back 30 of the user. When the fingers of the user clamp the connecting portion 120, the second body 130 may also be located on the palm 20 of the user, and the first body 110 may be located on the palm back 30 of the user.

Figure 2A:
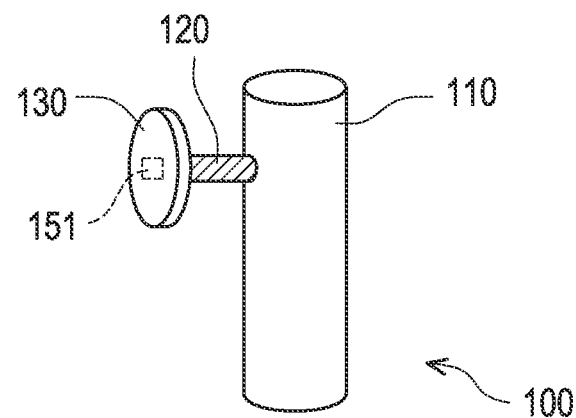
FIG. 2A is a schematic diagram of a handheld controller according to another embodiment of the invention.
Figure 2B:
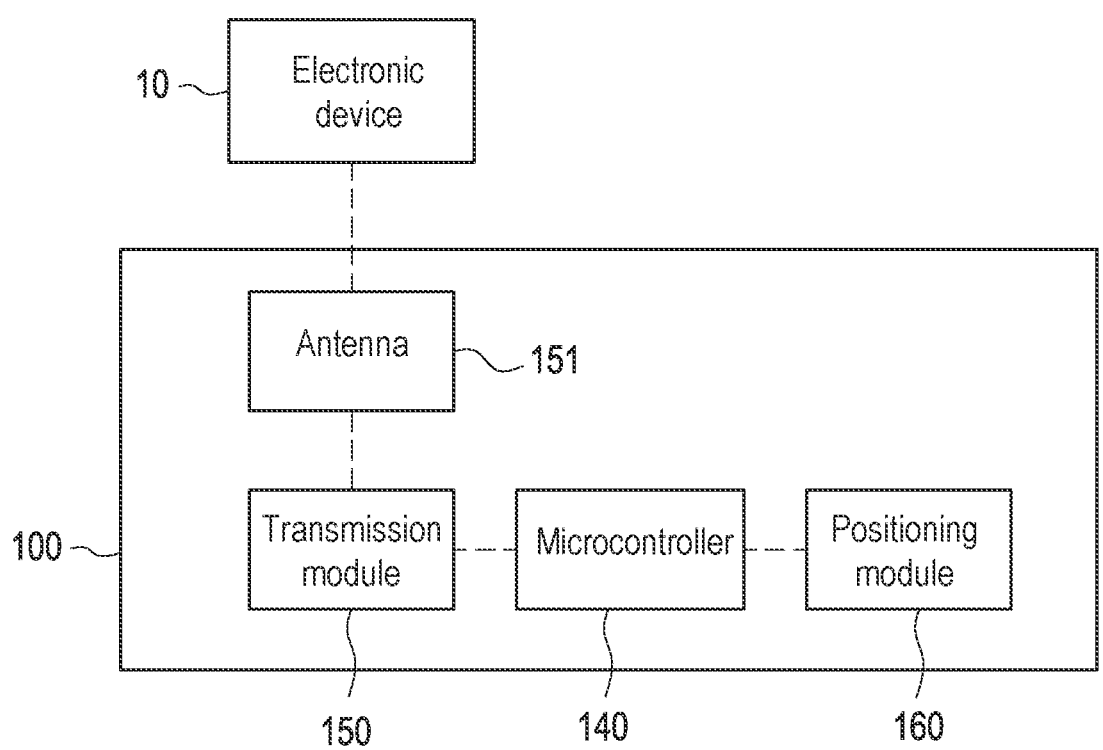
FIG. 2B is a block diagram of a control system of the handheld controller of FIG. 2A.

Referring to FIG. 2A and FIG. 2B, another embodiment shown therein is substantially the same as the embodiment of FIG. 1A. A difference there between is that the transmission module 150 of the handheld controller 100 further includes an antenna 151, and the antenna 151 is disposed in the second body 130. When the user uses the handheld controller 100 and moves, the positioning module 160 transmits the detected signal to the microcontroller 140, and then the transmission module 150 transmits the detected signal to the electronic device 10 through the antenna 151.

Figure 3A:
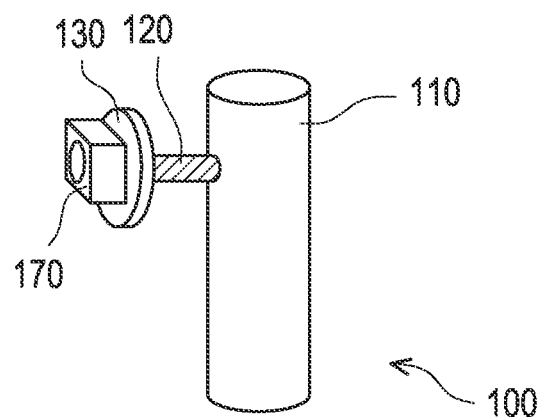
FIG. 3A is a schematic diagram of a handheld controller according to another embodiment of the invention.
Figure 3B:
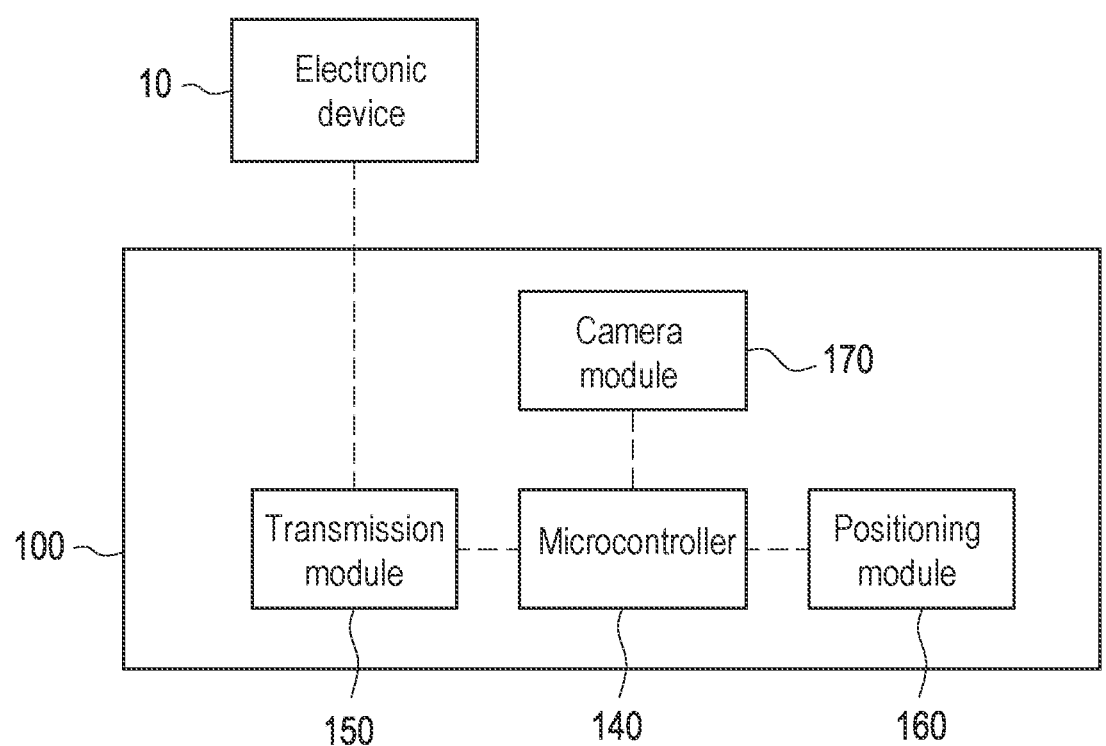
FIG. 3B is a block diagram of a control system of the handheld controller of FIG. 3A.

Referring to FIG. 3A and FIG. 3B, another embodiment shown therein is substantially the same as the embodiment of FIG. 1A. A difference there between is that the handheld controller 100 of FIG. 3A and FIG. 3B further includes a camera module 170, and the camera module 170 is disposed on the second body 130. The camera module 170 may be used as a detection element to detect an external environment, and since the camera module 170 is disposed on the second body 130, it may be prevented from being blocked by fingers. In addition, when the camera module 170 detects a signal, it transmits the signal to the microcontroller 140, and the transmission module 150 transmits the signal to the electronic device 10. Further, positioning information may also be generated based on an image captured by the camera module 170. Therefore, the coordinates of the handheld controller 100 in space are calculated based on the positioning information generated by the positioning module 160 and the positioning information generated based on the image captured by the camera module 170.

Figure 4A:
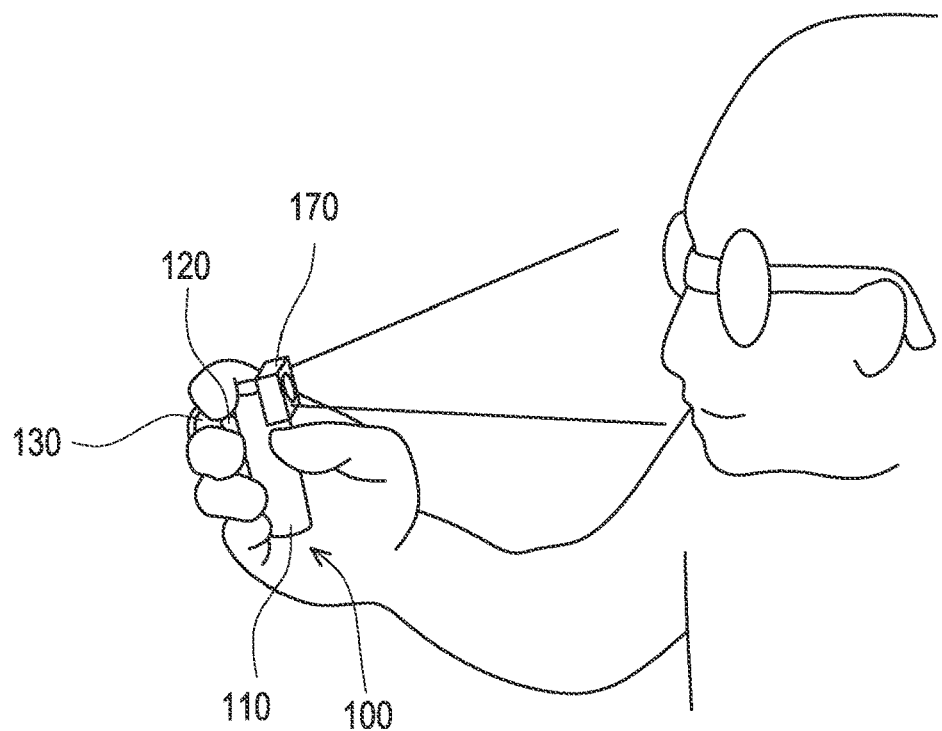
FIG. 4A is a schematic diagram of a handheld controller clamped on a user's hand according to another embodiment of the invention.
Figure 4B:
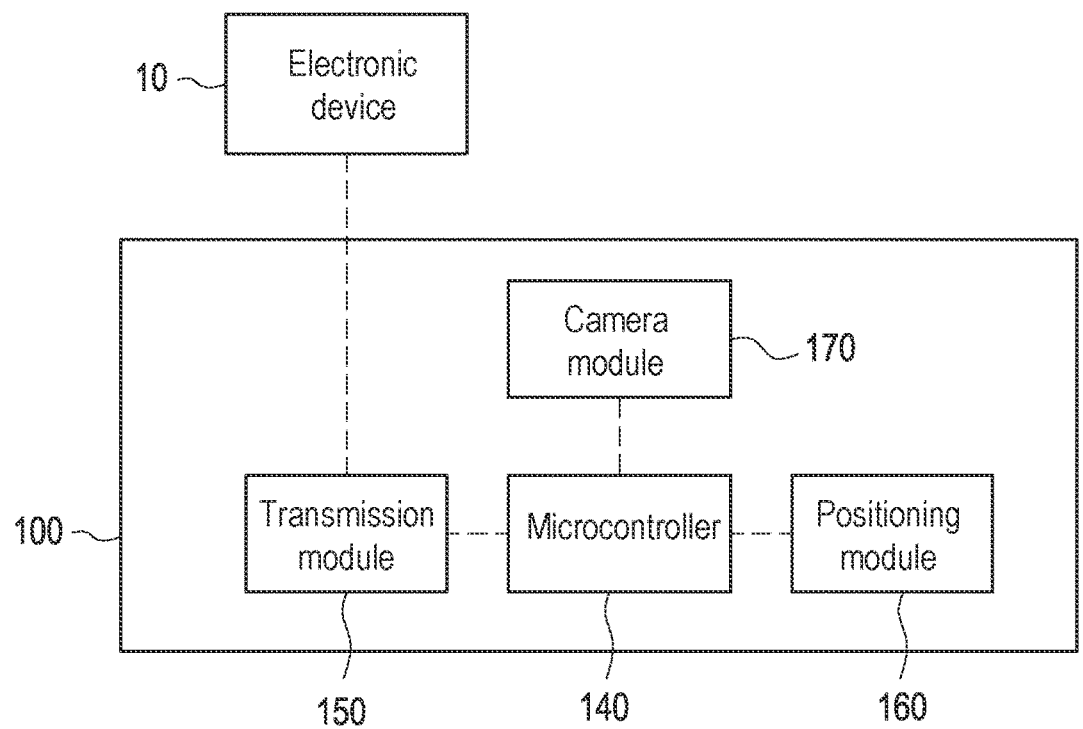
FIG. 4B is a block diagram of a control system of the handheld controller of FIG. 4A.

Referring to FIG. 4A and FIG. 4B, another embodiment shown therein is substantially the same as the embodiment of FIG. 1A. A difference there between is that the handheld controller 100 of FIG. 4A and FIG. 4B further includes a camera module 170, and the camera module 170 is disposed on the first body 110. When the camera module 170 is disposed on the first body 110, it may be used as a detection device to detect the face or the lip state of the user. In addition, when the camera module 170 detects a signal, it transmits the signal to the microcontroller 140, and the transmission module 150 is used to transmit the signal to the electronic device 10.

Figure 5A:
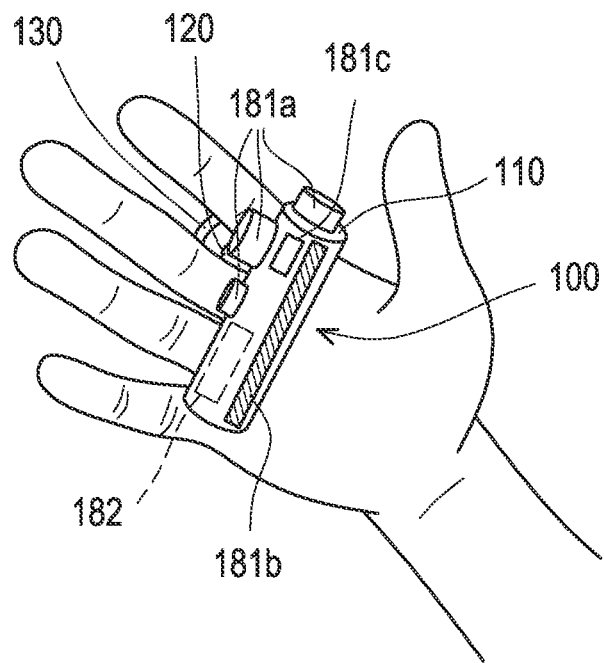
FIG. 5A is a schematic diagram of a handheld controller clamped on a user's hand according to another embodiment of the invention.
Figure 5B:
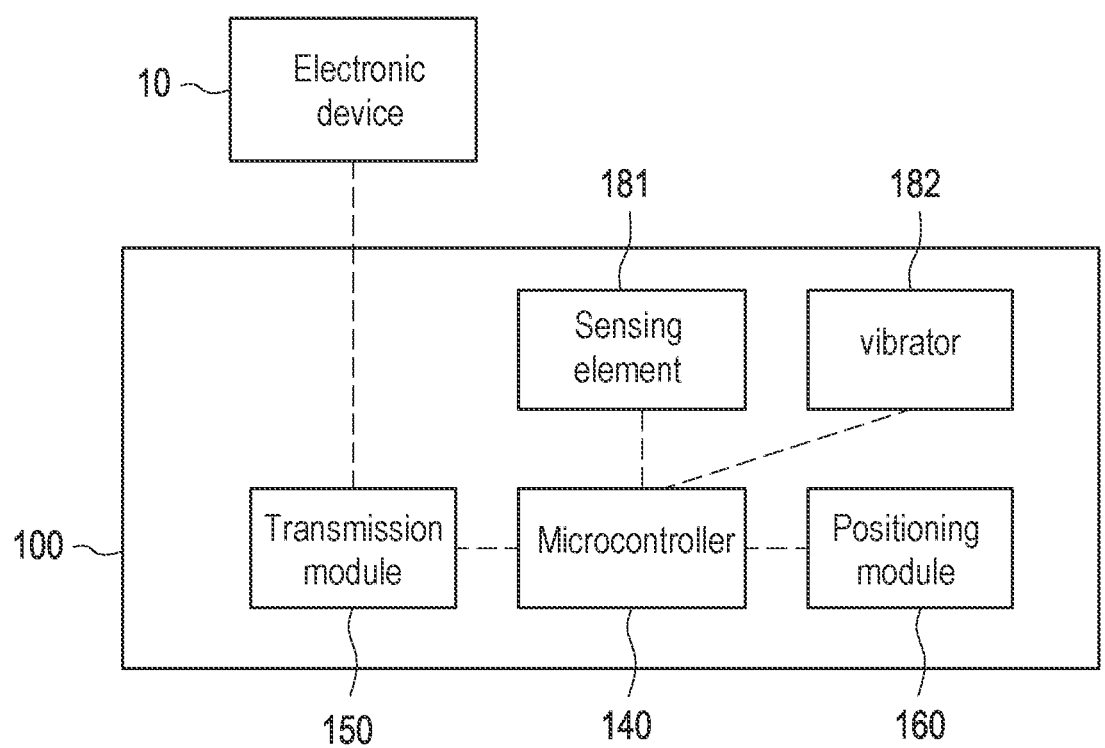
FIG. 5B is a block diagram of a control system of the handheld controller of FIG. 5A.

Referring to FIG. 5A and FIG. 5B, another embodiment shown therein is substantially the same as the embodiment of FIG. 1A. A difference there between is that the handheld controller 100 of FIG. 5A and FIG. 5B may include a plurality of sensing elements 181. The sensing element 181 may be at least one button 181a, a touch module 181b or a biosensor 181c. The sensing elements 181 may provide the user with functions of finger operation selection, or palm size, finger position or gesture state detection. When the sensing element 181 detects the signal, the sensing element 181 may transmit the signal to the microcontroller 140, and the transmission module 150 is used to transmit the signal to the electronic device 10. The handheld controller 100 of FIGS. 5A and 5B may further include a vibrator 182 to provide vibration for the user to feel.

Figure 6A:
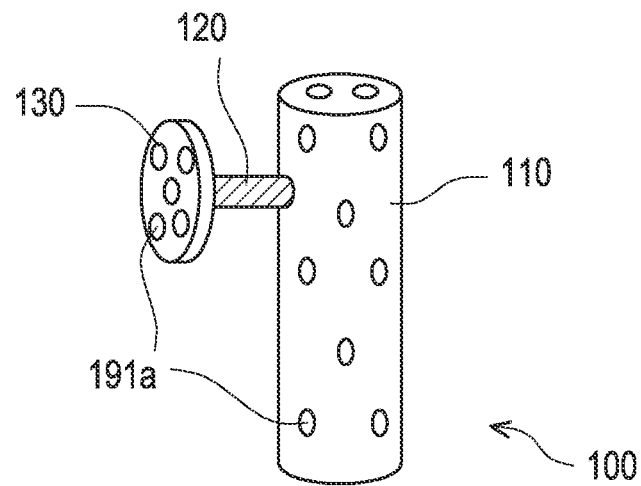
FIG. 6A is a schematic diagram of a handheld controller according to another embodiment of the invention.
Figure 6B:
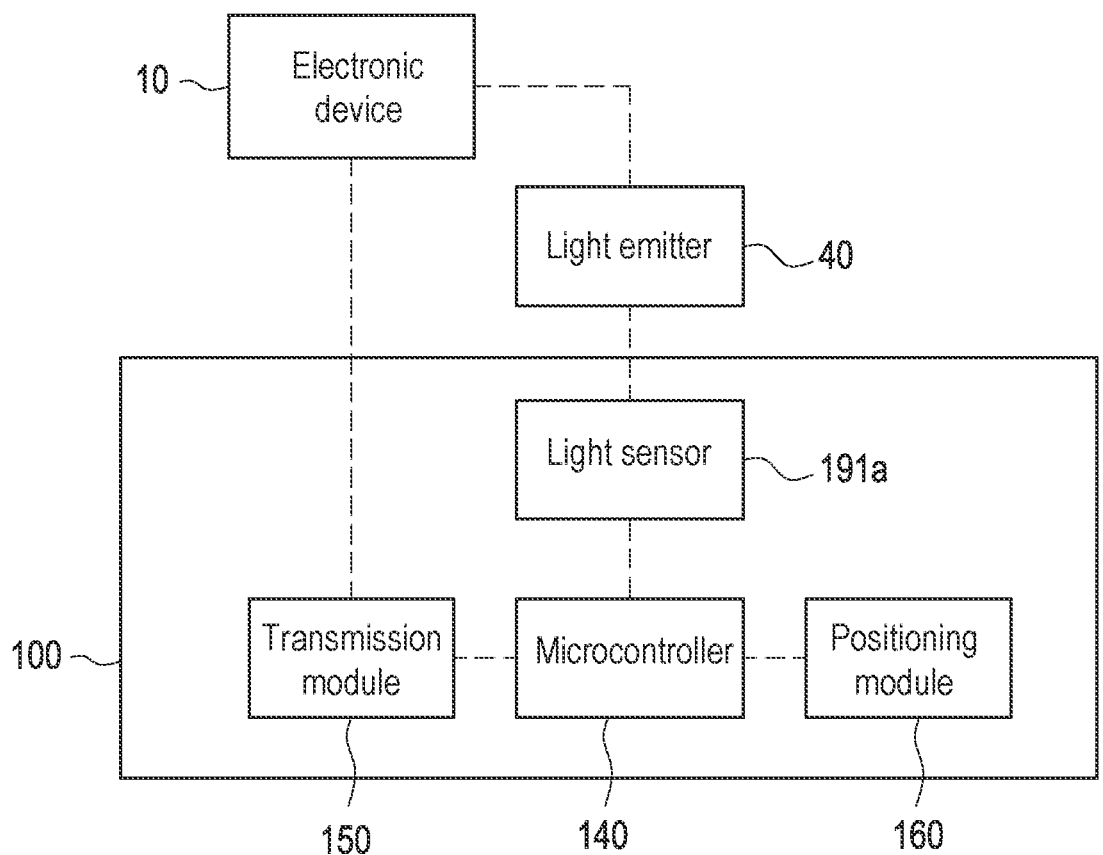
FIG. 6B is a block diagram of a control system of the handheld controller of FIG. 6A.

Referring to FIG. 6A and FIG. 6B, another embodiment shown therein is substantially the same as the embodiment of FIG. 1A. A difference there between is that the handheld controller 100 of FIG. 6A and FIG. 6B may include a plurality of light sensors 191a, which is disposed on the first body 110 and/or the second body 130. The light sensors 191a are used to detect the external light signals. In the embodiment, the light sensors 191a are distributed on the first body 110 and the second body 130 to increase a traceable volume and avoid being occluded during use. In detail, the light sensors 191a may be used to detect light signals emitted by a plurality of external light emitters 40. For example, the light emitters 40 may emit infrared light. When the light signals emitted by the light transmitters 40 are detected by the light sensors 191a of the electronic device 10, orientations of the light sensors 191a may be obtained. In more detail, relative positions of the light sensors 191a are fixed, and positioning information of the light sensors 191a is calculated based on a time difference of the light signals detected by the light sensors 191a. Therefore, based on the positioning information generated by the positioning module 160 and the positioning information generated by the light sensors 191a, coordinates of the handheld controller 100 in space are calculated.

Figure 7A:
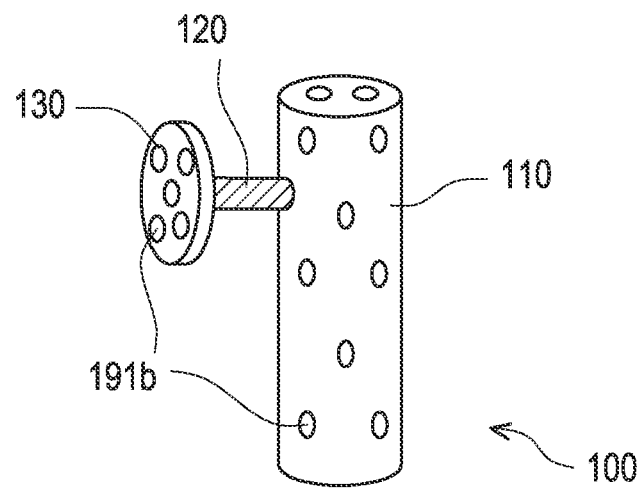
FIG. 7A is a schematic diagram of a handheld controller according to another embodiment of the invention.
Figure 7B:
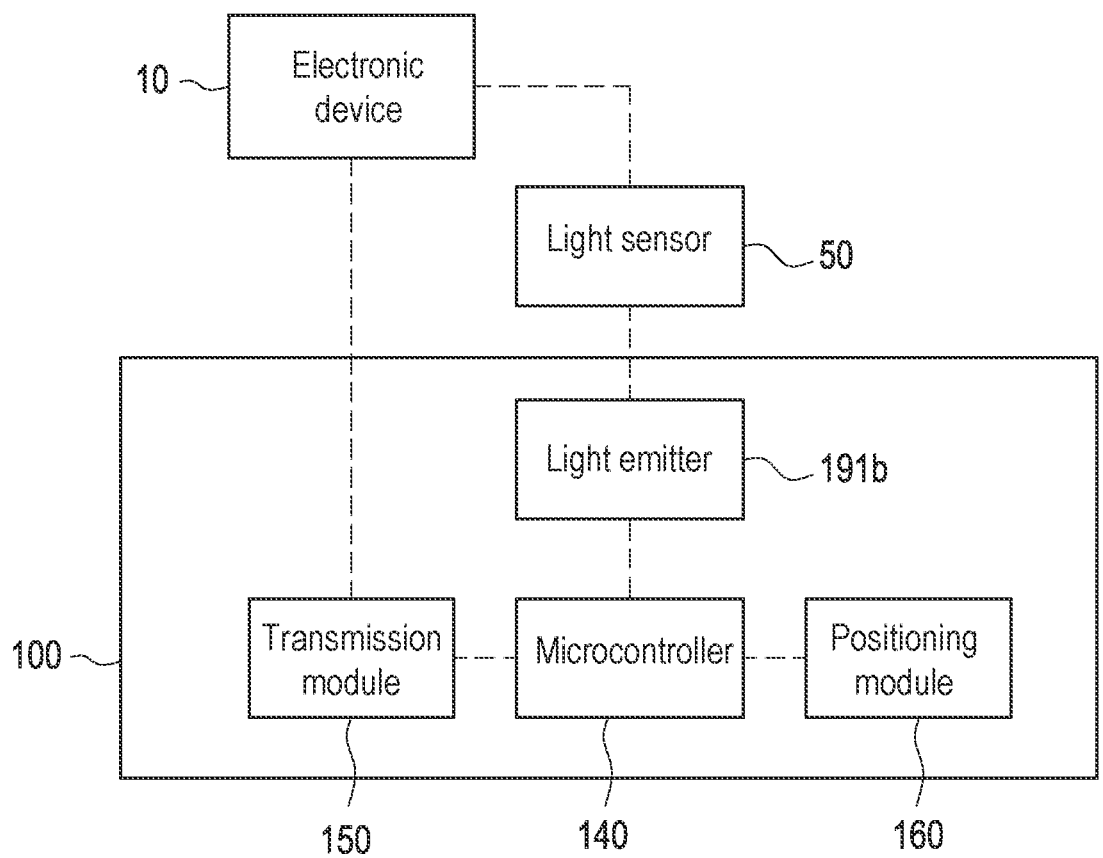
FIG. 7B is a block diagram of a control system of the handheld controller of FIG. 7A.

Referring to FIG. 7A and FIG. 7B, another embodiment shown therein is substantially the same as the embodiment of FIG. 1A. A difference there between is that the handheld controller 100 of FIGS. 7A and 7B may include a plurality of light emitters 191b disposed on the first body 110 and/or the second body 130. The light emitters 191b are used to provide light signals to the outside. In the embodiment, the light emitters 191b are distributed on the first body 110 and the second body 130 to increase a traceable volume and avoid being occluded during use. For example, the light emitter 191b may be a point light source, a point light source array, or a patterned light source. In detail, the light emitters 191b may be used to provide light signals for an external light sensor 50 to detect. When the electronic device 10 detects light signals provided by the light emitters 191b through the light sensor 50 (for example, a camera module), orientations of the light emitters 191b may be obtained. Since the relative positions of the light emitters 191b are fixed, positioning information of the light emitters 191b may be calculated based on the image captured by the light sensor 50. Therefore, based on the positioning information generated by the positioning module 160 and the positioning information generated by the light emitters 191b, the coordinates of the handheld controller 100 in space are calculated.

In summary, in the disclosure, since the handheld controller may be fixed on the hand by means of finger clamping, the user may easily fix the handheld controller on the hand, and the handheld controller is not easy to fall off even if there is a large movement. In addition, since an opening angle of the fingers is limited and the fingers are bent under a natural circumstance, the fingers are always maintained between the first body and the second body. When the user does not need to use the handheld controller, the handheld controller may be easily fixed on the hand without falling off. In addition, the handheld controller may have an inertial measurement unit, a point light source, a point light source array, a patterned light source, a light sensing array or at least one camera module, so as to be easily applied to various positioning technologies.

What is claimed is:

1. A handheld controller, suitable for controlling an electronic device, the handheld controller comprising:
    a first body, suitable for being held by a hand of a user, wherein the first body has a first end and a second end opposite to each other;
    a second body;
    a connecting portion, fixed on the first body and unmoveable relative to the first body, the connection portion is located between the first end and the second end, and a distance from the connecting portion to the first end is smaller than a distance from the connecting portion to the second end, the connecting portion connected the first body and the second body, wherein the second body is electrically connected to the first body through the connecting portion, and the connecting portion is suitable for being clamped between fingers of the user for being fixed on the hand of the user to move in space,
    wherein the first body further has a first holding portion and a second holding portion, the first holding portion is located between the connecting portion and the first end, and the second holding portion is located between the connecting portion and the second end, the first holding portion is adapted to be held by an index finger of the user, and the second holding portion is adapted to be held by at least a middle finger and a ring finger of the user,
    a camera module, arranged on the second body, and configured to detect an external environment;
    wherein when the fingers of the user clamp the connecting portion, the first body is located at a palm of the user and covered entirely, and one side of the second body is located at a palm back of the user and the camera module is disposed on the other side of the second body;
    a microcontroller;
    a transmission module, electrically connected to the microcontroller; and
    a positioning module, included an inertial measurement unit and electrically connected to the microcontroller, wherein when the user uses the handheld controller and moves, the positioning module transmits detected positioning information to the microcontroller, and then the positioning information is transmitted to the electronic device through the transmission module.

2. The handheld controller as claimed in claim 1, wherein the connecting portion transmits signals between the first body and the second body.

3. The handheld controller as claimed in claim 1, further comprising:
    an antenna, disposed on the second body, and configured to transmit a signal of the handheld controller to the electronic device.

4. The handheld controller as claimed in claim 1, further comprising:
    a camera module, arranged on the first body, and configured to detect a face state of the user.

5. The handheld controller as claimed in claim 1, further comprising:
    at least one sensing element, disposed on the first body, and configured to detect a finger position or gesture state of the user.

6. The handheld controller as claimed in claim 5, wherein the sensing element comprises at least one button, a touch module or a biosensor.

7. The handheld controller as claimed in claim 1, further comprising:
    a vibrator, disposed on the first body to provide vibration.

8. The handheld controller as claimed in claim 1, further comprising:
    a plurality of light sensors, disposed on the first body and/or the second body, and configured to detect external light signals.

9. The handheld controller as claimed in claim 1, further comprising:
    a plurality of light emitters, disposed on the first body and/or the second body, and configured to provide light signals to the outside.

* * * * *